(12) United States Patent
Miller

(10) Patent No.: US 10,089,117 B2
(45) Date of Patent: Oct. 2, 2018

(54) SYSTEM AND METHOD FOR MATCHING DRIVERS TO DEVICES

(71) Applicant: Dell Products, LP, Round Rock, TX (US)

(72) Inventor: Andrew T. Miller, Austin, TX (US)

(73) Assignee: Dell Products, LP, Round Rock ( * ) Notice: Subject to any disclaimer, the term of this patent is extended or adjusted under 35 U.S.C. 154(b) by 574 days.

(21) Appl. No.: 13/853,546

(22) Filed: Mar. 29, 2013

(65) Prior Publication Data

US 2014/0298360 A1 Oct. 2, 2014

(51) Int. Cl.
| | |
|---|---|
| G06F 3/00 | (2006.01) |
| G06F 9/44 | (2018.01) |
| G06F 9/46 | (2006.01) |
| G06F 13/00 | (2006.01) |
| G06F 9/4401 | (2018.01) |

(52) U.S. Cl.
CPC .................................. *G06F 9/4411* (2013.01)

(58) Field of Classification Search
None
See application file for complete search history.

(56) References Cited

U.S. PATENT DOCUMENTS

| | | | | |
|---|---|---|---|---|
| 5,630,076 | A | * | 5/1997 | Saulpaugh et al. ........... 710/104 |
| 5,802,365 | A | * | 9/1998 | Kathail ................. G06F 13/102 710/10 |
| 6,253,334 | B1 | * | 6/2001 | Amdahl et al. .............. 714/4.12 |
| 8,825,909 | B1 | * | 9/2014 | Delco ............................... 710/8 |
| 2004/0003135 | A1 | * | 1/2004 | Moore ........................... 709/321 |
| 2012/0185622 | A1 | | 7/2012 | Capomaggio | |
| 2013/0036431 | A1 | | 2/2013 | Douceur et al. | |

OTHER PUBLICATIONS

"OSGi Service Gateway Specification Release 1.0," The Open Services Gateway Initiative, Apr. 27, 2000 http://curie.eng/OSGi/index.html.
"OSGi Service-Platform Release 2," The Open Services Gateway Initiative, Oct. 2001 http://www.osgi.org/download/r2/sp-r2.book.pdf.
"OSGi Service Platform Service Compendium, Release 4, Version 4.2," The OSGi Alliance, Aug. 2009 http://www.osgi.org/download/r4v42/r4.cmpn.pdf.

* cited by examiner

*Primary Examiner* — Timothy A Mudrick
(74) *Attorney, Agent, or Firm* — Larson Newman, LLP

(57) ABSTRACT

An information handling system includes a management controller, which in turn includes a device access manager. The device access manager detects a new device within the information handling system, and performs a matching process between properties of the new device and matching criteria for a plurality of drivers in the information handling system. The device access manager also receives matching values from each of the plurality of drivers, and selects one of the drivers in response to the one driver having a highest matching value. The matching process for a driver is ended without a matching value being returned to the device access manager in response to a property of the new device not matching a corresponding matching criteria of the driver.

20 Claims, 5 Drawing Sheets

US 10,089,117 B2

SYSTEM AND METHOD FOR MATCHING DRIVERS TO DEVICES

FIELD OF THE DISCLOSURE

This disclosure generally relates to information handling systems, and more particularly relates to a system and method for matching drivers to devices.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems. An information handling system can include multiple devices and drivers for the devices. When a new device, such as a storage device, is connected to the information handling system, the information handling system can have a driver associated with the new device so that the information handling system can communicate with the new device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
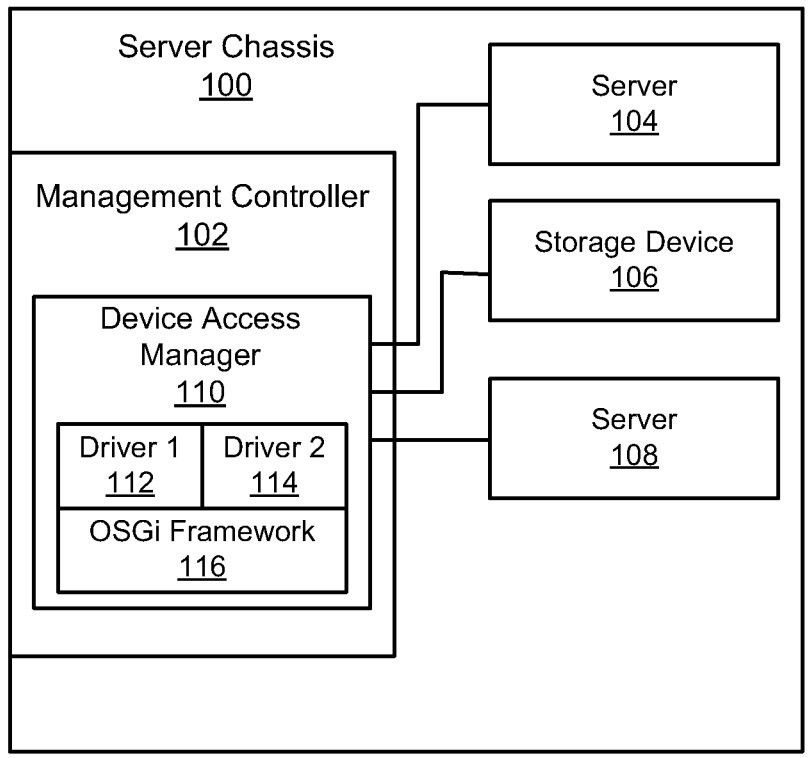
FIG. 1 is a block diagram of an information handling system.

FIG. 1 illustrates an information handling system 100, such as a server chassis. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The information handling system or server chassis 100 includes a management controller 102, a server 104, a storage device 106, and a server 108. The management controller 102 includes a device access manager 110, which in turn includes drivers 112 and 114 that operate within an Open Services Gateway initiative (OSGi) framework 116. In different embodiments, the management controller 102 can be any type of controller for the server chassis 100, such as an interactive Dell Remote Access controller or the like. The drivers 112 and 114 can utilize the OSGi framework 116 to enable the management controller to communicate with the server 104, the storage device 106, and the server 110.

During operation, when a new device, such as the server 108, is connected to the server chassis 100, the management controller 102 can detect the new device and can then invoke the device access manager 110 to select a best driver for the server out of the drivers installed in the device access manager. When the best driver is selected for the server 108, the device access manager 110 can then assign that driver to the server. The drivers 112 and 114 can be installed within the management controller 102 to be executed with respect to a newly added device, such as the server 104, the storage device 106, the server 108, or the like, without the management controller being restarted/rebooted. In an embodiment, the drivers 112 and 114 can be Java applications in the OSGi framework 116 for the management controller 102 to run with respect to an associated device within the server chassis 100. The selection of the best driver will be described with respect to FIGS. 2-4 below.

Figure 2:
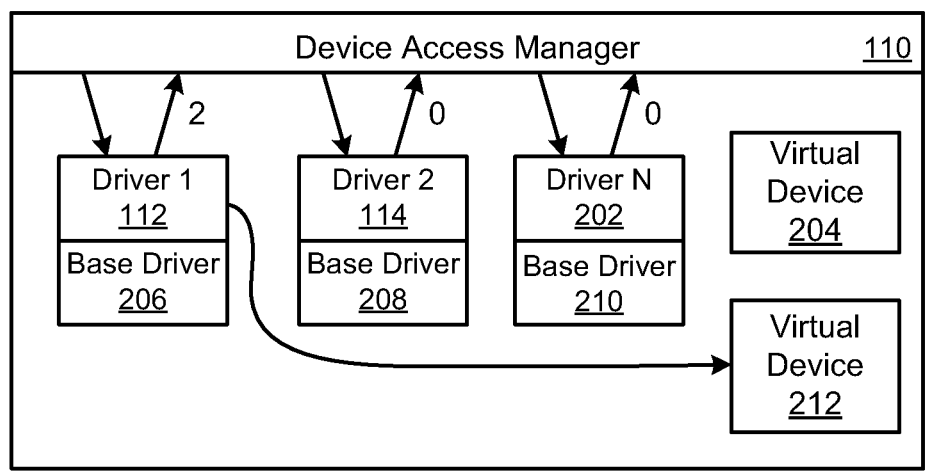
FIGS. 2-4 are diagrams of a device access manager in the information handling system matching drivers with a new device.

FIG. 2 shows a diagram of the device access manager 110 in the information handling system 100 implementing driver matching for a device. The device access manager 110 includes drivers 112, 114, and 202, and each driver includes a respective base driver 206, 208, and 210. In an embodiment, while drivers 112, 114, and 202, and the respective base drivers 206, 208, and 210 are shown as separate blocks, the driver and base driver can be a single object within the device access manager 110. When a device, such as server 104 or storage device 106 of FIG. 1, is connected to the management controller 102 of the server chassis 100 the management controller 102 initiates low-level drivers to determine whether the low-level drivers can communicate with the new device. Typically, each low-level driver implements a particular communication protocol, such as web services management (WS-Man), remote access controller administration (RACADM), or the like. Each low-level driver that can communicate with the device can create a virtual device 204, which in turn triggers a driver matching process to determine which of the drivers 112, 114, and 202, if any, have defined matching criteria that match properties of the device.

The base drivers 206, 208, and 210 can implement the matching process for each corresponding driver 112, 114, and 202. The base drivers 206, 208, and 210 can determine matching criteria for the respective driver 112, 114, and 202 by retrieving meta-data associated with the driver that is stored with the respective driver. The meta-data can be updated at any time by a user of the server chassis 100 to change the matching criteria for the associated driver 112, 114, and 202 without having to recompile the code of the driver. Thus, including the matching criteria as meta-data for the driver 112, 114, or 202 can provide the user with the ability to update a driver easier than if the code of the driver had to be recompiled.

The meta-data can indicate a value type used in the comparison of matching criteria to a property of the virtual device 204. The value types can include a simple string value, a simple integer value, a list of string values, a list of integer values, a version string, a list of version strings, a version range, a list of version ranges, or the like. Also, each of the value types can have an associated matching rule, which can set requirements on how the value type should be matched with the property of a device. For example, a matching rule can be that the device property should be an exact match of the matching criteria, should match one of a list of matching criteria values, should be greater than or equal to a matching value, should be within a range of values, or the like. Exemplary value types, descriptions of the value types, and matching rules are shown in Table 1 below:

TABLE 1

| Property Value Type | Description | Example and Matching Rule |
| --- | --- | --- |
| Simple string value | Any string | 12G<br>Matches this exact value |
| Simple integer value | Any non-negative integer | 5<br>Matches this exact value |
| List of string values | A comma-separated list of strings | 11G, 12G, 13G<br>Matches one of the strings |
| List of integer values | A comma-separated list of integers | 1, 2, 3, 5, 8<br>Matches one of the integers |
| Version string | A string of the form x.y.z, where x, y, z are non-negative integers | 1.3.6<br>Matches if version => 1.3.6 |
| List of version strings | A comma-separated list of version strings | 1.3.6, 1.3.7, 1.3.8<br>Matches one of the version strings |
| Version range | A set of two version strings enclosed in either square brackets or parentheses, separated by a comma. A square-bracket denotes inclusivity. A parenthesis denotes exclusivity | [1.0.0,2.0.0)<br>Matches if 1.0.0 <= version < 2.0.0 |
| List of version ranges | A comma-separated list of version ranges | [1.0.0,2.0.0),[2.1.0,3.0.0) |

The management controller 102 can detect the device and can initiate a driver matching process. In an embodiment, the device can be a new physical device, such as a server, a storage device, or the like. After the low-level drivers create the virtual device 204, the device access manager 110 can activate each of the drivers 112, 114, and 202 to implement the driver matching. In an embodiment, each of the drivers 112, 114, and 202 can extend the same base driver code to perform common functionality, such as metadata based driver matching. During the driver matching process, each of the drivers 112, 114, and 202 to determine different properties of the device. Each of the base drivers 206, 208, and 210 can implement a property determination function to determine the properties of the respective drivers 112, 114, and 202. For example, each of the drivers 112, 114, and 202 contain meta-data associated the matching criteria for that driver. The matching criteria for the driver 112 can be server.generation=11G, and server.BIOS.generation=[3.0.0, 4.0.0). In this case, the properties of the virtual device 204 should be a server generation of 11G and the BIOS generation should be within the range of 3.0.0 to 4.0.0 so that the properties of the device match the matching criteria of the driver 112.

The base driver 206 can then request the properties of the device. The driver 112 can implement a get property function and can send a get property request to the virtual device 204 to retrieve the properties of the device. The virtual device 204 can then utilize a low-level driver or discovery driver to get the individual properties of the device. The virtual device 204 can respond to the get property request with properties of server.generation=11G and server.BIOS-.version=3.4.0. The base driver 206 can then determine that the server.generation property is an exact match, and that the server.BIOS.generation property is within the range property of the driver 112. The driver 112 can then return a matching value of two the device access manager 110 based on both of the properties matching the matching criteria of the driver 112. The matching value represents a number of properties of the device that matches the matching criteria of a driver.

The matching criteria for the driver 114 can be server.generation=12G, and server.BIOS.generation=[1.2.0, 1.3.6). In this case, the properties of the virtual device 204 should be a server generation of 12G and the BIOS generation should be within the range of 1.2.0 to 1.3.6 so that the properties of the device match the matching criteria of the driver 114. The base driver 208 can then request the properties of the device. The driver 114 can implement the get-property function and can send a get property request to the virtual device 204 to retrieve the properties of the device. The virtual device 204 can respond to the get property request with properties of server.generation=11 G and server.BIOS.version=3.4.0. The base driver 206 can then determine that the server.generation property does not match the matching criterion server.generation of the driver 114, and in response the base driver can immediately end the matching process and the driver 114 return a matching value of zero to the device access manager 110.

The base driver 210 can then request the properties of the device. The driver 202 can implement the get-property function and can send a get property request to the virtual device 204 to retrieve the properties of the device. The driver 202 type, such as a server driver, memory driver, printer driver, or the like, can affect the ability of the base driver 210 to communicate with the virtual device 204 and retrieve the properties of the device. For example, if the driver 202 is a printer driver and the device is a memory device without any printing capabilities, the base driver 210 may not use the same communication protocols as the device so that the base driver cannot retrieve the properties of the device. In this situation, the base driver 210 cannot receive any properties of the virtual device 204 and the driver 202 can then return a matching value of zero to the device access manager 110.

The device access manager 110 can use each of the matching values provided by the drivers 112, 114, and 202 to determine the best driver for the virtual device 204. In this case, the device access manager 110 can determine that the driver 112 is the best driver for the virtual device 204 based on the driver 112 having a matching value of two and the drivers 114 and 202 having matching values of zero. The device access manager 110 can then attach driver 112 to the virtual device 204 representing new device, which can cause the driver to create a new virtual device 212. In an embodiment, the virtual device 212 is created to determine whether another driver can also be attached to the device. For example, when the driver 112 is attached to the virtual device 204, the driver can have the knowledge of the device, via low-level drivers, so that the driver can communicate with the device to get additional properties for the device. The driver 112 can retrieve these properties and populate the values into the virtual device 212 so that the properties can be utilized in the driver matching for the virtual device. In an embodiment, if multiple drivers return the same matching value the device access manager 110 can use another criterion, such a version of the driver, as the factor in selecting the best driver for the device.

Figure 3:
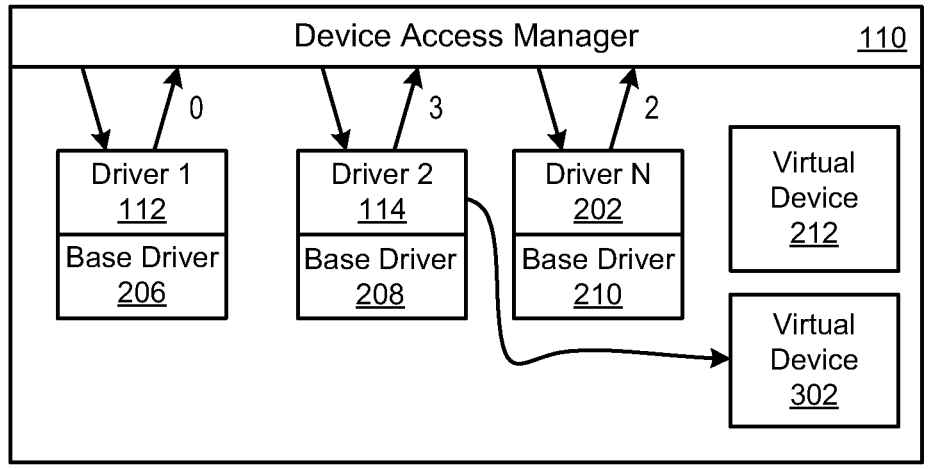

FIG. 3 shows a diagram of the device access manager 110 implementing driver matching for the virtual device 212. The management controller 102 can detect the virtual device 212 created by the driver 112, and can initiate the driver matching in the device access manager 110 for the virtual device. In an embodiment, the drivers 112, 114, and 116 with respective base drivers 206, 208, and 210 can be the same drivers or can be different drivers as described above with respect to FIG. 2, but for simplicity the same reference numbers are used. The device access manager 110 can activate each of the drivers 112, 114, and 202 to implement the driver matching.

The base driver 206 can determine whether the virtual device 212 already has an attached driver, and if so, can determine whether the attached driver is the driver 112. In this situation, the driver 112 can be attached driver of the virtual device 212 based on the driver creating the virtual device 212, and in response the base driver 206 can end the matching process and the driver 112 can return a matching value of zero to the device access manager 110.

The base driver 208 can determine whether the virtual device 212 already has an attached driver, and if so, can determine whether the attached driver is the driver 114. In this situation, the driver 114 is not attached driver of the virtual device 212 and the base driver can continue with the driver matching. The base driver 208 can retrieve meta-data associated with the driver 114 to determine the matching criteria for the driver. For example, the matching criteria for the driver 114 can be server.generation=12G, server.BIOS. generation=[1.0.0, 1.23.23), and server.accesscontroller.version 1.06.06, 1.23.23. In this case, the properties of the virtual device 212 should be a server generation of 12G, the BIOS generation should be within the range of 1.0.0 to 1.23.23, and a server.accesscontroller.version of either 1.06.06 or 1.23.23 so that the properties of the virtual device match the matching criteria of the driver 114. The base driver 208 can then request the properties of the device. The driver 114 can implement the get-property function and can send a get property request to the virtual device 212 to retrieve the properties of the device. The virtual device 212 can respond to the get property request with properties of server.generation=12G, server.BIOS.generation=1.3.6, and server.accesscontroller.version 1.23.23. The base driver 206 can then determine that the server.generation property is an exact match, that the server.BIOS.generation property is within the range property of the driver 114, and that the server.accesscontroller.version matches one of the two values of the driver. In this situation, the driver 114 can return a matching value of three to the device access manager 110.

The base driver 210 can determine whether the virtual device 212 already has an attached driver, and if so, can determine whether the attached driver is the driver 202. In this situation, the driver 202 is not attached driver of the virtual device 212 and the base driver can continue with the driver matching. The base driver 210 can retrieve meta-data associated with the driver 112 to determine the matching criteria for the driver. For example, the matching criteria for the driver 202 can be server.generation=12G, and server.accesscontroller.version=[1.0.0, 1.23.23]. In this case, the properties of the virtual device 212 should be a server generation of 12G, and a server.accesscontroller.version should be in the range of 1.06.06 to 1.23.23 so that the properties of the virtual device match the matching criteria of the driver 202. The base driver 210 can then request the properties of the device. The driver 202 can implement the get-property function and can send a get property request to the virtual device 212 to retrieve the properties of the device. The virtual device 212 can respond to the get property request with properties of server.generation=12G, server.BIOS.generation=1.3.6, and server.accesscontroller.version 1.23.23. The base driver 210 can then determine that the server.generation property is an exact match, the server.BIOS.generation property is not a matching criterion of the driver 202 and can be ignored, and that the server.accesscontroller.version is within the range of values of the driver. In this situation, the driver 202 can return a matching value of two to the device access manager 110.

The device access manager 110 can use each of the matching values provided by the drivers 112, 114, and 202 to determine the best driver for the virtual device 212. In this case, the device access manager 110 can determine that the driver 114 is the best driver for the virtual device 212 based on the driver 114 having a matching value of three, the driver 112 having matching value of zero, and the driver 202 having a matching value of two. The device access manager 110 can then attach driver 114 to the virtual device 212, which can cause the driver to create a new virtual device 302. The virtual device 302 can be created to determine whether another driver can also be attached to the device. When the driver 114 is attached to the virtual device 212, the driver can have the knowledge of the device so that the driver can communicate with the device to get additional properties for the device. The driver 114 can retrieve these properties and populate the values into the virtual device 302 so that the properties can be utilized in the driver matching for the virtual device.

Figure 4:
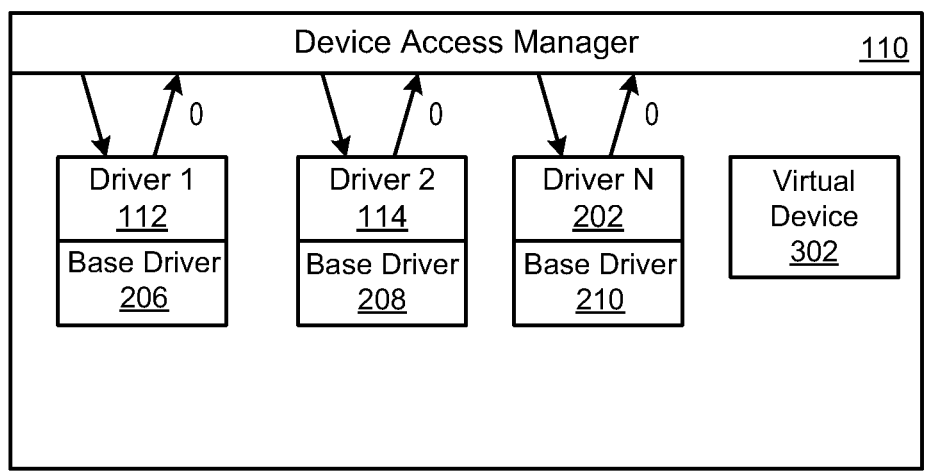

FIG. 4 shows a diagram of the device access manager 110 implementing driver matching for the virtual device 302. The management controller 102 can detect that the virtual device 212 created by the driver 114, and can initiate a driver matching process in the device access manager 110 for the virtual device. In an embodiment, the drivers 112, 114, and 116 with respective base drivers 206, 208, and 210 can be the same drivers or can be different drivers as described above with respect to FIGS. 2 and 3, but for simplicity the same reference numbers are used. The device access manager 110 can activate each of the drivers 112, 114, and 202 to implement the driver matching.

The base driver 206 can determine whether the virtual device 302 already has an attached driver, and if so, can determine whether the attached driver is the driver 112. In this situation, the driver 112 can be attached driver of the virtual device 302 based on the driver creating the virtual device 212 from which the virtual device 302 was created. The driver 112 is also attached to the virtual device 302 based on the virtual device being created from the virtual device 212. The base driver 206 can then end the driver matching and the driver 112 can return a matching value of zero to the device access manager 110.

The base driver 208 can determine whether the virtual device 302 already has an attached driver, and if so, can determine whether the attached driver is the driver 114. In this situation, the driver 114 can be attached driver of the virtual device 302 based on the driver creating the virtual device 302, and in response the base driver 208 can end the matching process and the driver 114 can return a matching value of zero to the device access manager 110.

The base driver 210 can determine whether the virtual device 302 already has an attached driver, and if so, can determine whether the attached driver is the driver 202. In this situation, the driver 202 is not attached driver of the virtual device 302 and the base driver can continue with the driver matching. The base driver 210 can retrieve meta-data associated with the driver 112 to determine the matching criteria for the driver. For example, the matching criteria for the driver 202 can be server.generation=12G, and server.memory=>80. In this case, the properties of the virtual device 302 should be a server generation of 12G, and a server memory of 80 or more so that the properties of the virtual device match the matching criteria of the driver 202. The base driver 210 can then request the properties of the device. The driver 202 can implement the get-property function and can send a get property request to the virtual device 302 to retrieve the properties of the device. The virtual device 302 can respond to the get property request with properties of server.generation=12G, server.memory=70. The base driver 210 can then determine that the server.generation property is an exact match, but the server.memory property is not a match. In this situation, the base driver 210 can immediately end the driver matching and the driver 202 can return a matching value of zero.

The device access manager 110 can determine that none of the drivers 112, 114, and 202 match the virtual device 302 base on all of the matching values being zero. The device access manager 110 does not attach a driver to the virtual device 302, and can then end the driver matching. Thus, the device access manager 110 can continue to attach driver to the devices until no match is determined between the device and a driver, and the device access manager can utilize the last attached driver as the driver for the device.

Figure 5:
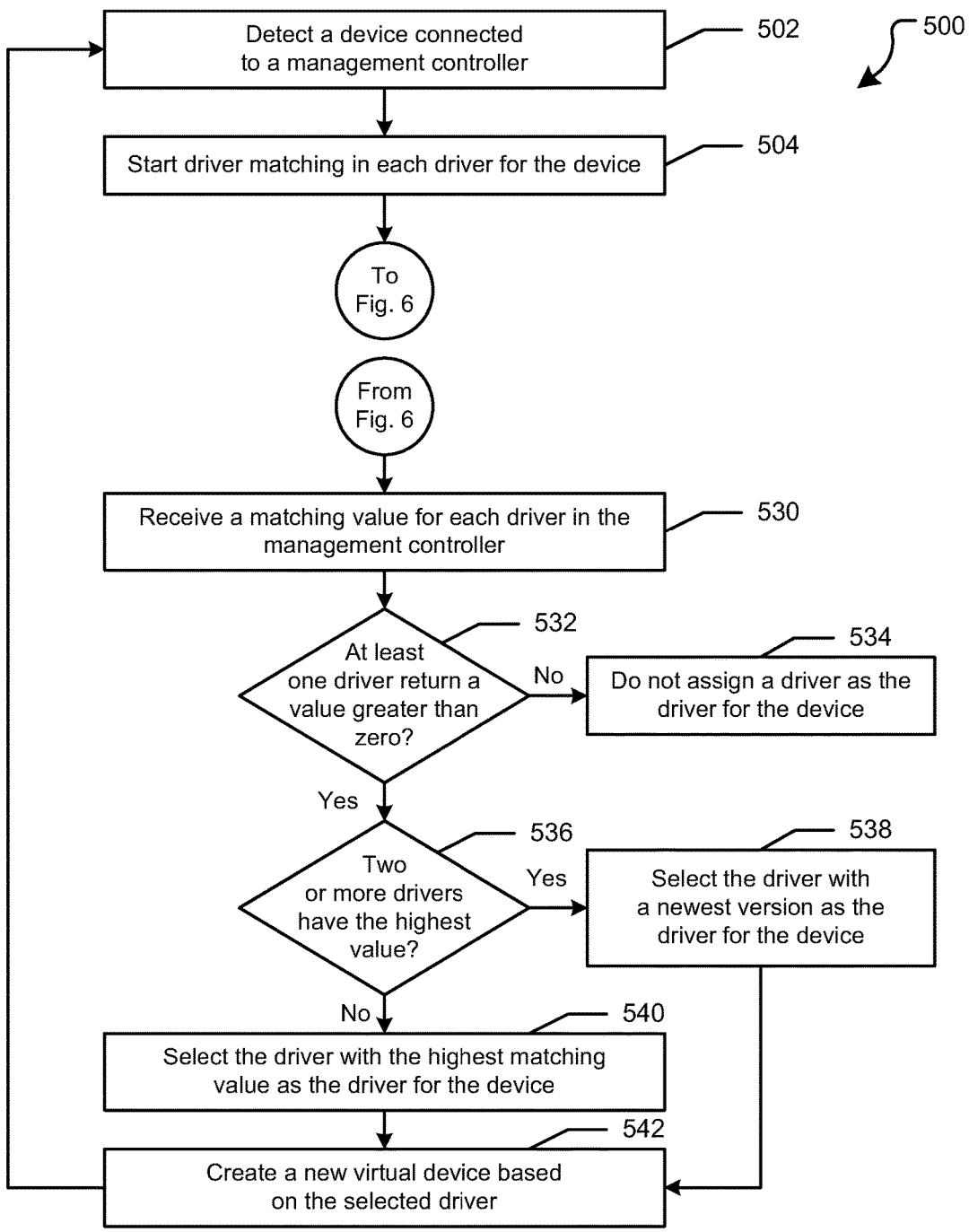
FIGS. 5 and 6 are a flow diagram of a method for determining a driver for the new device.
Figure 6:
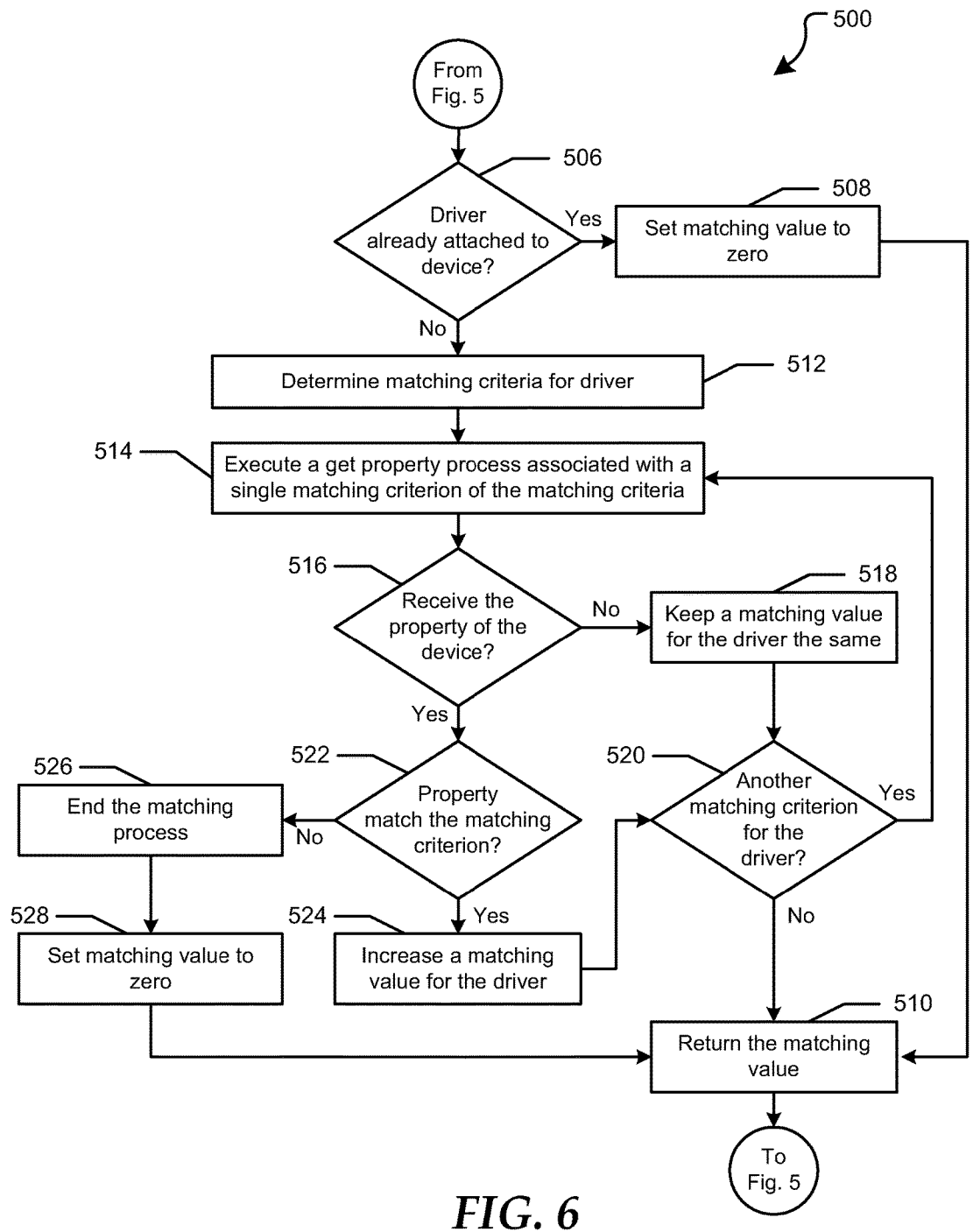

FIGS. 5 and 6 show a flow diagram of a method 500 for determining a driver for the new device. At block 502, a device is detected by a management controller of a server chassis or other information handling system. In an embodiment, the device can be a new physical device, such as a server, a storage device, or the like, or the device can be a virtual device created by a driver in the management controller. Driver matching is started in each driver in a device access manager of the management controller at block 504. In an embodiment, blocks 506-528 can be executed by each driver in the device access manager. However, for simplicity blocks 506-528 are only described with respect to a single driver. At block 506, a determination is made whether the driver is already attached to the device. In an embodiment, the driver can be already attached to the device in response to the driver having created the device. If the driver is already attached to the device, a matching value is set to zero at block 508. At block 510, the matching value is returned to the device access manager. If the driver is not already attached to the device, device matching criteria for the driver are determined at block 512. The matching criteria can include memory size, type of memory, storage type, firmware version, version of the system, or the like. The matching criteria can be added as metadata to the driver after the driver has been created.

At block 514, a get property function for a property associated with a single matching criterion of the matching criteria is executed. At block 516, a determination is made whether the property of the device is received. If the property is not received, a matching value for the driver is kept the same at block 518. At block 520, a determination is made whether there is another matching criterion for the driver. If there is another matching criterion for the driver, the flow continues as stated above at block 514. If there is not another matching criterion for the driver, the matching value of the driver is returned to the device access manager at block 510.

If, at block 516, the property is received from the device, a determination of whether the property matches the matching criterion is made at block 522. If the property matches the matching criterion, the matching value is increased at block 524 and the flow continues as stated above at block 520. If the property does not match the matching criterion, the matching process is ended at block 526. At block 528, the matching value is set to zero and the matching value is returned to the device access manager at block 510. In an embodiment, the matching value is set to zero in response to the matching process being ended so that any mismatch between properties of the device and the matching criteria of the driver can automatically disqualify the driver as being the best driver for the device.

At block 530, the matching value is received from each driver in the device access manager of the management controller. At block 532, a determination is made whether at least one driver returned a matching value greater than zero. If no driver returned a matching value greater than zero, no driver is attached to the device at block 534. If at least one driver returned a matching value greater than zero, a determination of whether two or more drivers have the highest matching value is made at block 536. If two or more drivers have the highest matching value, the driver with the newest version is selected as the driver for the device at block 538. If only one driver has the highest matching value, the driver with the highest matching value is selected as the driver for the device at block 540. At block 542, a new virtual device is created by the selected driver, and the flow continues as stated above at block 502.

Figure 7:
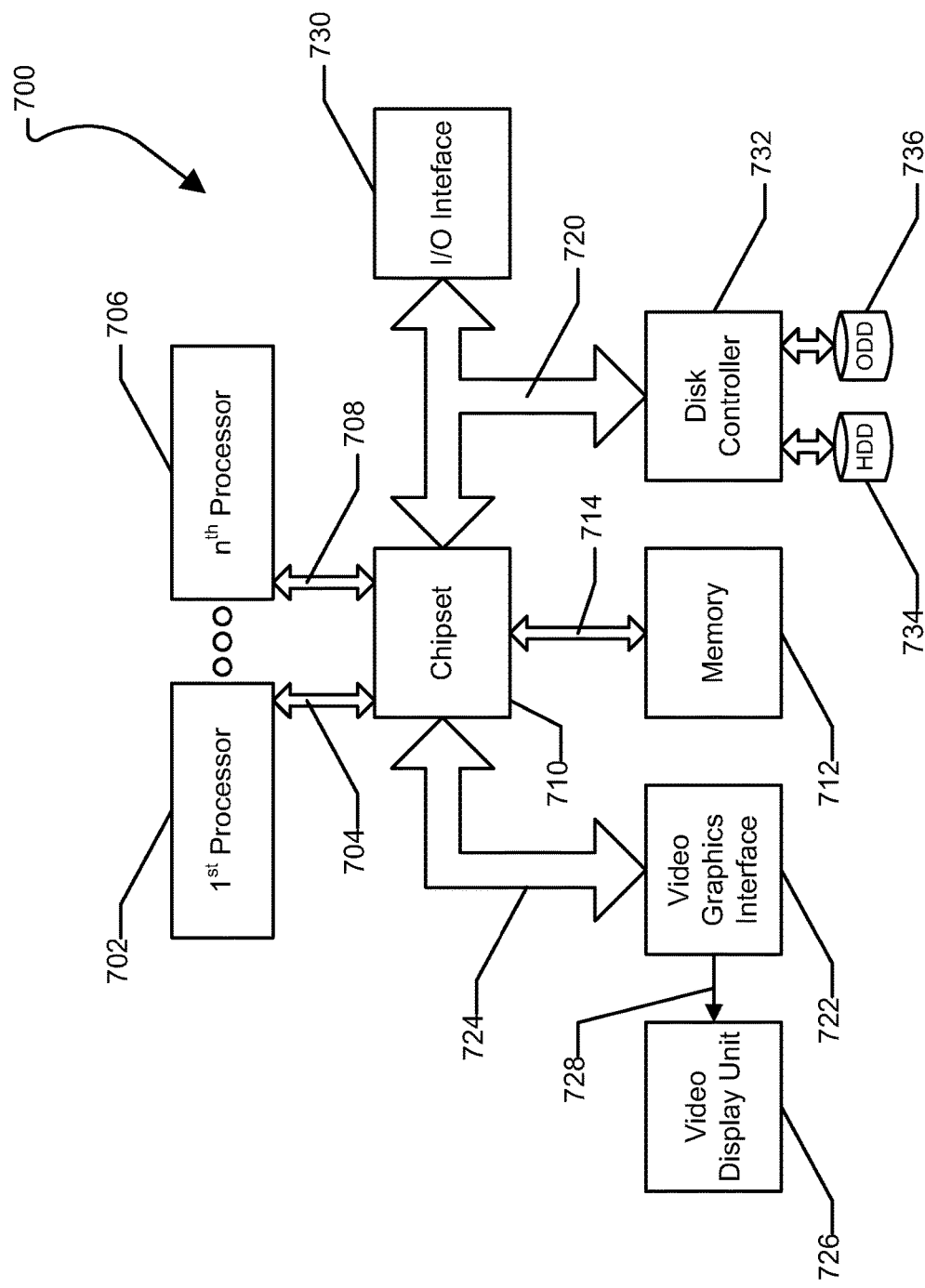
FIG. 7 is a block diagram of a general information handling system.

As shown in FIG. 7, an information handling system 700, such as the information handling system 100, can include a first physical processor 702 coupled to a first host bus 704 and can further include additional processors generally designated as $n^{th}$ physical processor 706 coupled to a second host bus 708. The first physical processor 702 can be coupled to a chipset 710 via the first host bus 704. Further, the $n^{th}$ physical processor 706 can be coupled to the chipset 710 via the second host bus 708. The chipset 710 can support multiple processors and can allow for simultaneous processing of multiple processors and support the exchange of information within information handling system 700 during multiple processing operations.

The chipset 710 can be referred to as a memory hub or a memory controller. For example, the chipset 710 can include an Accelerated Hub Architecture (AHA) that uses a dedicated bus to transfer data between first physical processor 702 and the $n^{th}$ physical processor 706. For example, the chipset 710, including an AHA enabled-chipset, can include a memory controller hub and an input/output (I/O) controller hub. As a memory controller hub, the chipset 710 can function to provide access to first physical processor 702 using first bus 704 and $n^{th}$ physical processor 706 using the second host bus 708. The chipset 710 can also provide a memory interface for accessing memory 712 using a memory bus 714. In a particular embodiment, the buses 704, 708, and 714 can be individual buses or part of the same bus. The chipset 710 can also provide bus control and can handle transfers between the buses 704, 708, and 714.

Alternatively, the chipset 710 can be generally considered an application specific chipset that provides connectivity to various buses, and integrates other system functions. For example, the chipset 710 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 710. The chipset 710 can also be packaged as an application specific integrated circuit (ASIC).

The information handling system 700 can also include a video graphics interface 722 that can be coupled to the chipset 710 using a third host bus 724. In one form, the video graphics interface 722 can be an Accelerated Graphics Port (AGP) interface to display content within a video display unit 726. Other graphics interfaces may also be used. The video graphics interface 722 can provide a video display output 728 to the video display unit 726. The video display unit 726 can include one or more types of video displays such as a flat panel display (FPD) or other type of display device.

The information handling system 700 can also include an I/O interface 730 that can be connected via an I/O bus 720 to the chipset 710. The I/O interface 730 and I/O bus 720 can include industry standard buses or proprietary buses and respective interfaces or controllers. For example, the I/O bus 720 can also include a Peripheral Component Interconnect (PCI) bus or a high speed PCI-Express bus. In one embodiment, a PCI bus can be operated at approximately 33 MHz and a PCI-Express bus can be operated at more than one speed, such as 2.5 GHz, 5 GHz, 8 GHz, and 16 GHz. PCI buses and PCI-Express buses can be provided to comply with industry standards for connecting and communicating between various PCI-enabled hardware devices. Other buses can also be provided in association with, or independent of, the I/O bus 720 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 710 can be a chipset employing a Northbridge/Southbridge chipset configuration (not illustrated). For example, a Northbridge portion of the chipset 710 can communicate with the first physical processor 702 and can control interaction with the memory 712, the I/O bus 720 that can be operable as a PCI bus, and activities for the video graphics interface 722. The Northbridge portion can also communicate with the first physical processor 702 using first bus 704 and the second bus 708 coupled to the $n^{th}$ physical processor 706. The chipset 710 can also include a Southbridge portion (not illustrated) of the chipset 710 and can handle I/O functions of the chipset 710. The Southbridge portion can manage the basic forms of I/O such as Universal Serial Bus (USB), serial I/O, audio outputs, Integrated Drive Electronics (IDE), and ISA I/O for the information handling system 700.

The information handling system 700 can further include a disk controller 732 coupled to the I/O bus 720, and connecting one or more internal disk drives such as a hard disk drive (HDD) 734 and an optical disk drive (ODD) 736 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail above, those skilled in the art will readily appreciate that many modifications are possible in the exemplary embodiments without materially departing from the novel teachings and advantages of the embodiments of the present disclosure. For example, the methods described in the present disclosure can be stored as instructions in a computer readable medium to cause a processor, such as chipset 710, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a management controller including a device access manager configured to detect a new device within the information handling system, to perform a matching process between properties of the new device and matching criteria for a plurality of drivers in the information handling system, to receive matching values from each of the plurality of drivers, wherein a matching value of a driver represents a number of properties of the device that matches the matching criteria of the driver and the matching value increases in value in response to each property of the device that matches the matching criteria of the driver, and to select one of the drivers in response to the one driver having a highest matching value, wherein the matching process for a driver is ended without a matching value being returned to the device access manager in response to a property of the new device not matching a corresponding matching criteria of the driver.

2. The information handling system of claim 1 wherein the device access manager is further configured to determine whether one of the drivers is already attached to the device, and to set the matching value to zero in response to the one of the drivers already being attached to the device.

3. The information handling system of claim 2 wherein the driver is already attached to the device in response to the driver having created the device as a virtual device.

4. The information handling system of claim 1 wherein the matching criteria for each of the drivers is metadata associated individually with each of the drivers.

5. The information handling system of claim 1 wherein the device is a new physical device connected to the information handling system.

6. The information handling system of claim 1 wherein the device is a server or a storage device within the information handling system.

7. The information handling system of claim 1 wherein the device is a virtual device created by another driver in the management controller.

8. The information handling system of claim 1 wherein the matching criteria includes memory size, type of memory, storage type, firmware version, and version of the system.

9. A method comprising:
   determining matching criteria for a driver in response to a device being detected by a management controller of an information handling system and the driver being not already attached to the device, wherein the matching criteria is included in metadata added to the driver;
   executing a get property function for a property of the device associated with a single matching criterion of the matching criteria;
   determining whether the property of the device is received from the get property function;
   keeping a matching value for the driver the same when the property of the device is not received;
   determining whether the property matches the single matching criterion when the property of the device is received;
   increasing a matching value when the property matches the single matching criterion;
   ending a driver matching process and setting the matching value to zero when the property does not match the single matching criterion.

10. The method of claim 9 further comprising:
    determining whether the driver is already attached to the device; and
    setting the matching value to zero in response to the driver already being attached to the device.

11. The method of claim 10 wherein the driver is already attached to the device in response to the driver having created the device.

12. The method of claim 9 wherein the device is a new physical device connected to the information handling system.

13. The method of claim 9 wherein the device is a server or a storage device within the information handling system.

14. The method of claim 9 wherein the device is a virtual device created by another driver in the management controller.

15. The method of claim 9 wherein the matching criteria includes memory size, type of memory, storage type, firmware version, and version of the system.

16. A method comprising:
    detecting, by a management controller, a device within an information handling system;
    starting a driver matching in each of a plurality of drivers in the management controller;
    receiving a matching value from each of the drivers, wherein the matching value for one of the drivers is based on a number of properties of the device that match matching criteria in the one of the drivers, and wherein the driver matching is ended for the one of the devices and the matching value for the one of the devices is set to zero when a property of the device does not match any of the matching criteria of the one of the devices;
    determining whether at least two drivers have the same highest matching value;
    selecting the driver with a newest version number as the driver for the device when at least two drivers have the same highest matching value;
    attaching the driver with the highest matching value as the driver for the device when only one driver has the highest matching value; and
    creating a new virtual device associated with the attached driver.

17. The method of claim 16 wherein the matching criteria is included in metadata added to each of the drivers.

18. The method of claim 16 wherein the device is a new physical device connected to the information handling system.

19. The method of claim 16 wherein the device is a virtual device created by another driver in the management controller.

20. The method of claim 16 wherein the matching criteria includes memory size, type of memory, storage type, firmware version, and version of the system.

* * * * *